United States Patent [19]

Schroeder

[11] Patent Number: 5,316,357
[45] Date of Patent: May 31, 1994

[54] EXTENSION WALL ATTACHMENT STRUCTURE FOR PICKUP TRUCKS

[76] Inventor: James C. Schroeder, 8020 23rd Ave. North, Golden Valley, Minn. 55427

[21] Appl. No.: 106,706

[22] Filed: Aug. 16, 1993

[51] Int. Cl.⁵ .............................................. B60P 3/04
[52] U.S. Cl. ...................................... 296/36; 296/26; 296/43; 296/100
[58] Field of Search .......................... 296/26, 10-14, 296/43, 32, 36

[56] References Cited

U.S. PATENT DOCUMENTS

| 322,184 | 7/1985 | Jonas | 296/36 |
|---|---|---|---|
| 979,309 | 12/1910 | Johnston | 296/36 |
| 2,054,122 | 9/1936 | Eisenberg, Jr. | 296/10 |
| 2,324,508 | 7/1943 | Johnson | 296/36 |
| 2,711,342 | 6/1955 | Selzer | 296/32 |
| 2,856,225 | 10/1958 | Selzer | 296/13 |
| 3,097,012 | 7/1963 | Bain | 296/10 |
| 3,989,148 | 11/1976 | Donohue | 296/10 |
| 4,585,264 | 4/1986 | Miller | 296/3 |
| 4,730,866 | 3/1988 | Nett | 296/100 |
| 4,838,602 | 6/1989 | Nett | 296/100 |
| 4,906,038 | 3/1990 | Morris | 296/14 |

*Primary Examiner*—Robert R. Song
*Attorney, Agent, or Firm*—Moore & Hansen

[57] ABSTRACT

A quickly attachable/detachable extension wall structure for a pickup truck has side panels which are attached to conventional stake pocket tie-downs having transverse apertures. Each side panel includes a lower slotted channel within which threaded nuts may slide. Flanged fasteners have a first "quick release" end for attachement to the tie-downs, and a second end which is attached to the slidable nuts in the side panels, for rigid attachement of the side panels to the tie-downs. A front panel is removably attachable to the side panels, and a rear panel is removably, swivelly attached to the side panels.

19 Claims, 6 Drawing Sheets

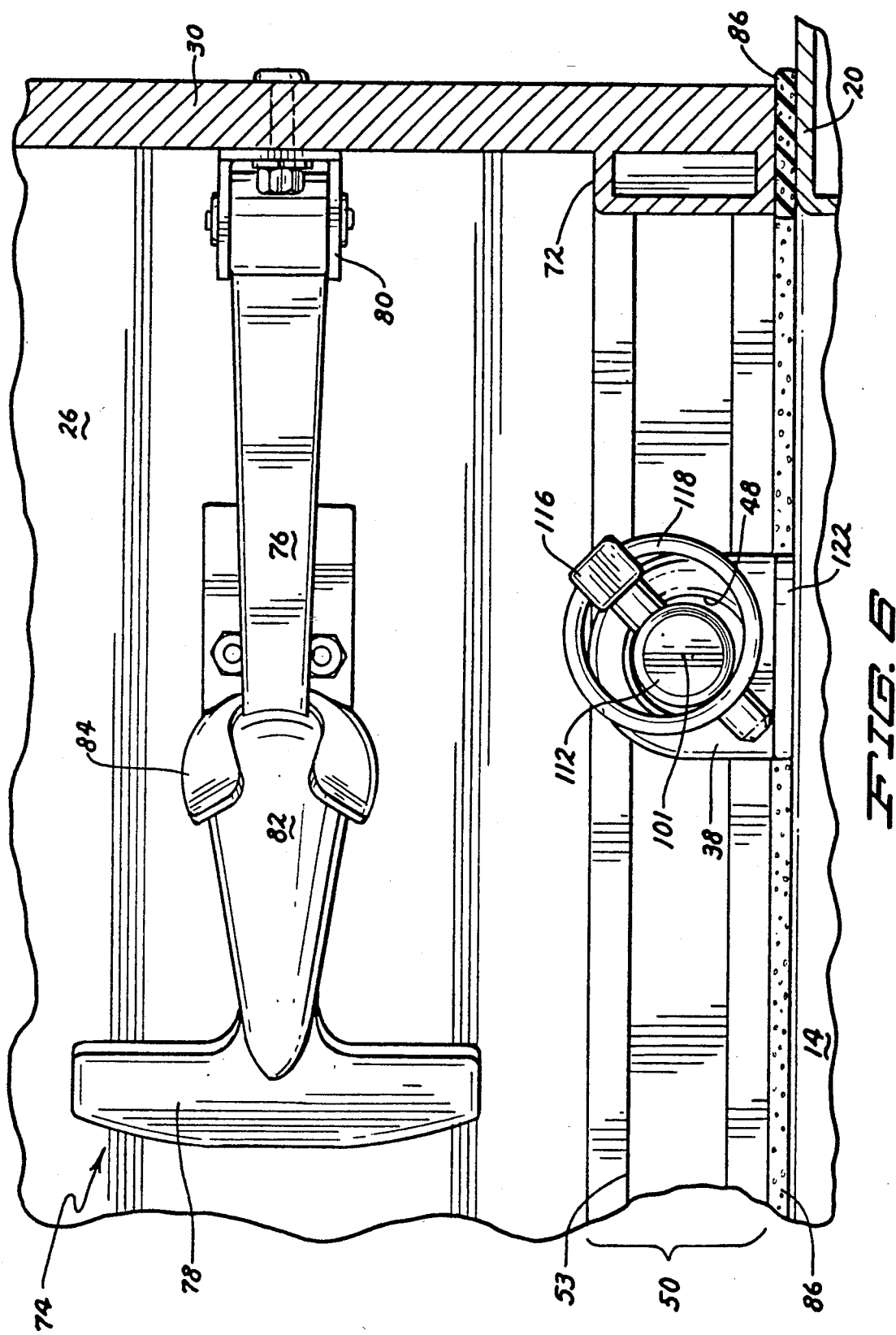

EXTENSION WALL ATTACHMENT STRUCTURE FOR PICKUP TRUCKS

BACKGROUND OF THE INVENTION

This invention relates generally to cargo compartments of pickup trucks. More particularly, this invention pertains to upstanding extension walls and means for attaching such extension walls to the cargo compartment of a pickup truck for increasing the load capacity.

Conventional pickup truck cargo compartments consist of a pair of spaced sidewalls rigidly connected to a supporting floor. A front wall interconnects the forward ends of the side walls and a tail gate typically spans the rear end of the cargo compartment. The sidewall, front wall and tail gate extend a relatively short distance above the floor, limiting the capacity of the compartment. Efforts have been expended in developing extension walls for increasing the capacity of pickup trucks and other vehicles.

An early form of upwardly extending wall panel is typified in U.S. Pat. No. 979,309 of Johnston. The panel is held in place by two sets of cleats and an external clamp. The use of cleats for attaching an extension wall panel to a pickup truck cargo compartment is impractical because of the complex shape of the compartment's side walls. The clamp requires the drilling of holes in the pickup truck, and is designed for permanent installation.

An apparatus found useful by a large number of pickup truck users is the tie-down which is fitted into a stake pocket. A common form of the tie-down includes an exterior annulus such as an eye hook, and an expansion member which is inserted and locked in a stake pocket. The apparatus of the Johnston patent would require removal of any installed tie-downs prior to installation of the extension wall panels.

Other extension wall panels are attached to the pickup truck by stakes which are installed in the stake pockets. The stakes may be fixed to the wall panel, as in U.S. Pat. Nos. 4,585,264 of Miller and 2,711,342 of Selzer. Alternatively, sliding stakes may be used, as shown in Selzer U.S. Pat. No. 2,856,225. In each of these versions, any tie-downs installed in the stake pockets must first be removed. In addition, the particular fasteners used are mounted on the external walls of the panels so that the extension wall panels do not have a smooth, aerodynamic exterior but have visible fasteners and/or other extraneous apparatus on the wall exterior.

None of the wall structures of these patents may be interchangeably installed on cargo compartments having varying spacing between the stakes, or having a variable number of stakes.

BRIEF SUMMARY OF THE INVENTION

A primary object of this invention is to provide a removably attachable extension panel structure for a pickup truck cargo compartment whereby the available carrying space is expanded upwardly.

A further object of the invention is to provide a removably attachable extension panel structure which may be attached without removing tie-downs installed in the stake pockets.

A further object of the invention is to provide an attachment system for joining extension wall panels to a pickup truck cargo compartment without drilling holes in the pickup truck or otherwise affecting the integrity of the truck body.

Another object of the invention is to provide a tonneau cover mount for a pickup truck at an elevated position from the cargo compartment side walls.

An additional object of the invention is to provide an attachment system for removably joining extension wall panels to a pickup truck whereby the system is adaptable to pickup trucks having variable numbers and/or spacing of stake pockets.

A further object of the invention is to provide an extension wall panel structure which is removably installable whether or not a bed liner is fitted in the cargo compartment.

Another object of the invention is to provide an extension wall panel structure without any fasteners on the visible exterior of the walls.

These and other objects and advantages of the invention will be readily understood by reading the following description in conjunction with the accompanying figures of the drawings wherein like reference numerals have been applied to designate like elements throughout the several views.

BRIEF DESCRIPTION OF THE DRAWINGS

FIG. 6 is a partial inside view of the rear portion of an extension side wall of the invention, as taken along line 6—6 of FIG. 5.

DESCRIPTION OF THE PREFERRED EMBODIMENTS

Figure 1:
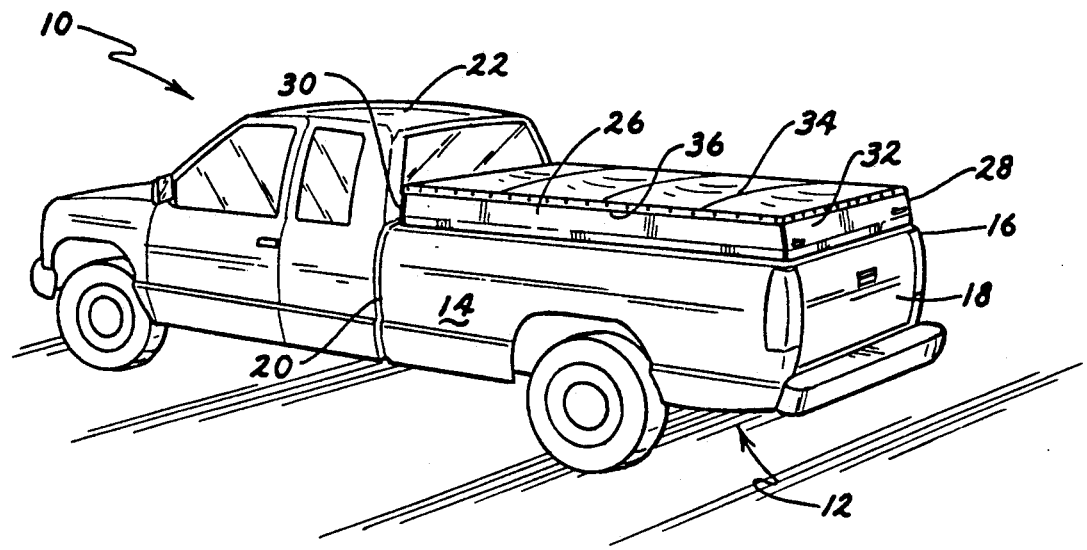
FIG. 1 is a partially cut-away perspective view of a pickup truck with a set of extension walls of the invention mounted on the cargo bed walls.
Figure 7:
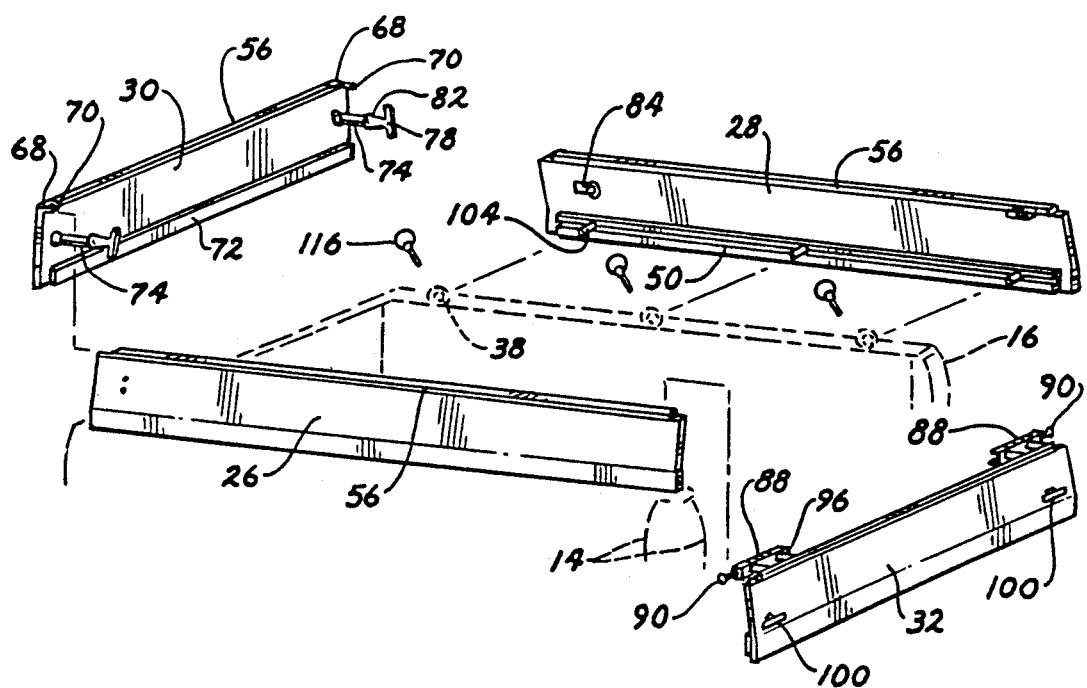
FIG. 7 is a partially exploded perspective view of a set of extension walls of the invention.

With reference to the drawings, and particularly to FIG. 1, the reference numeral 10 indicates a pickup truck having a cargo compartment 12 with sidewalls 14, 16, a forward wall 20 and a tail gate 18. The truck cab 22 for the driver is shown forward of the cargo compartment 12. An extension wall structure 24 of the invention is depicted in the drawing as including left and right side panels 26, 28, front panel 30 and rear panel 32. The drawing shows the extension wall structure 24 having an upper cover attachment apparatus 36 to which a tonneau cover 34 is attached. Although the generally planar extension panels may be oriented to extend vertically from the sidewalls 14, 16 of the cargo compartment 12, the overall appearance may be improved if the side and rear panels are slanted somewhat inwardly to generally follow the lines of the sidewalls. In addition, the fuel economy of the truck may be improved by a more aerodynamic design. The extension walls are easily attached and detached from the cargo compartment, without any modification of the truck.

As shown, the components of the entire extension wall apparatus, except where specifically stated otherwise, are arranged in mirror symmetry about a vertical, median, longitudinal plane. Consequently, a description of the parts on one side serves equally to identify the parts on the opposite side.

Figure 2:
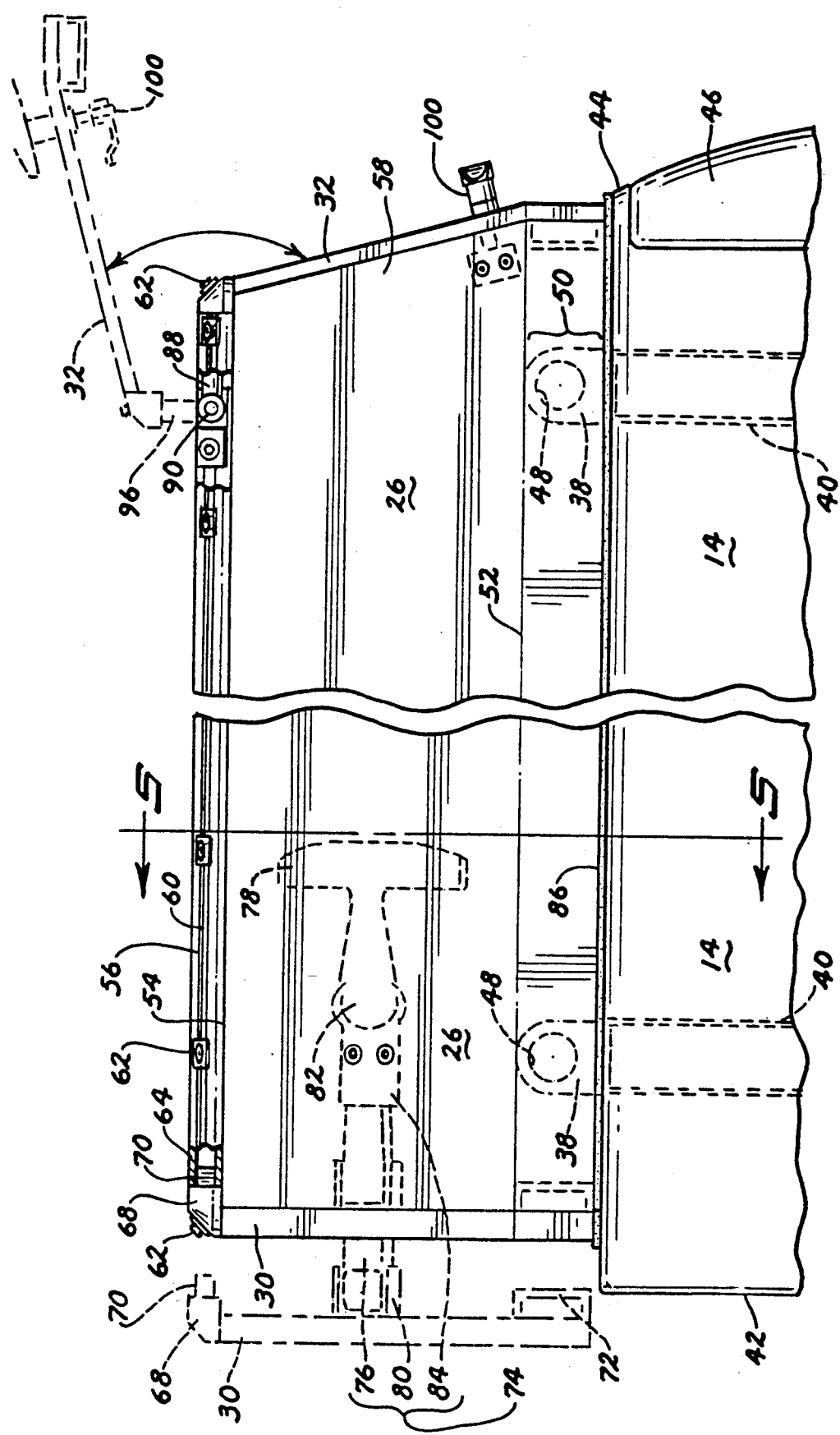
FIG. 2 is a partial exterior side view of a set of extension side walls of the invention mounted on the cargo bed walls of a pickup truck.

Turning now to FIG. 2, the left sidewall 14 of the cargo compartment 12 is shown with front end 42 and rear end 44 with a taillight 46. Conventional tie-downs 38 with circular transverse ports 48 are shown installed in the stake pockets 40 in accordance with means known in the art.

Figure 4:
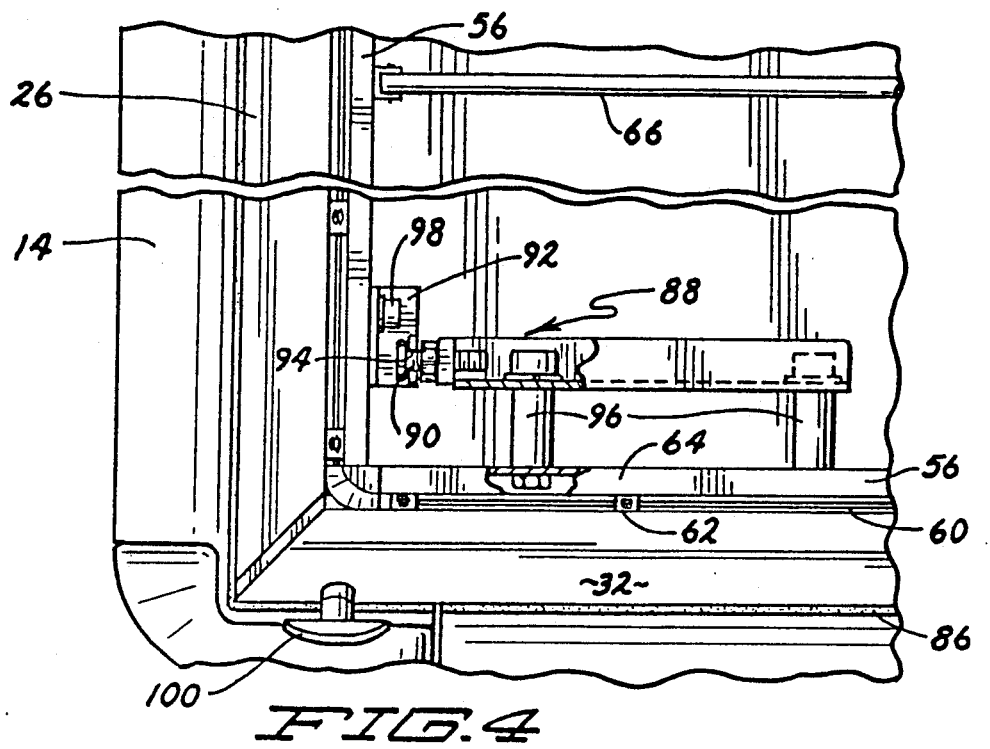
FIG. 4 is a partial plan view of the extension walls of the invention mounted on the cargo bed walls of a pickup truck.
Figure 3:
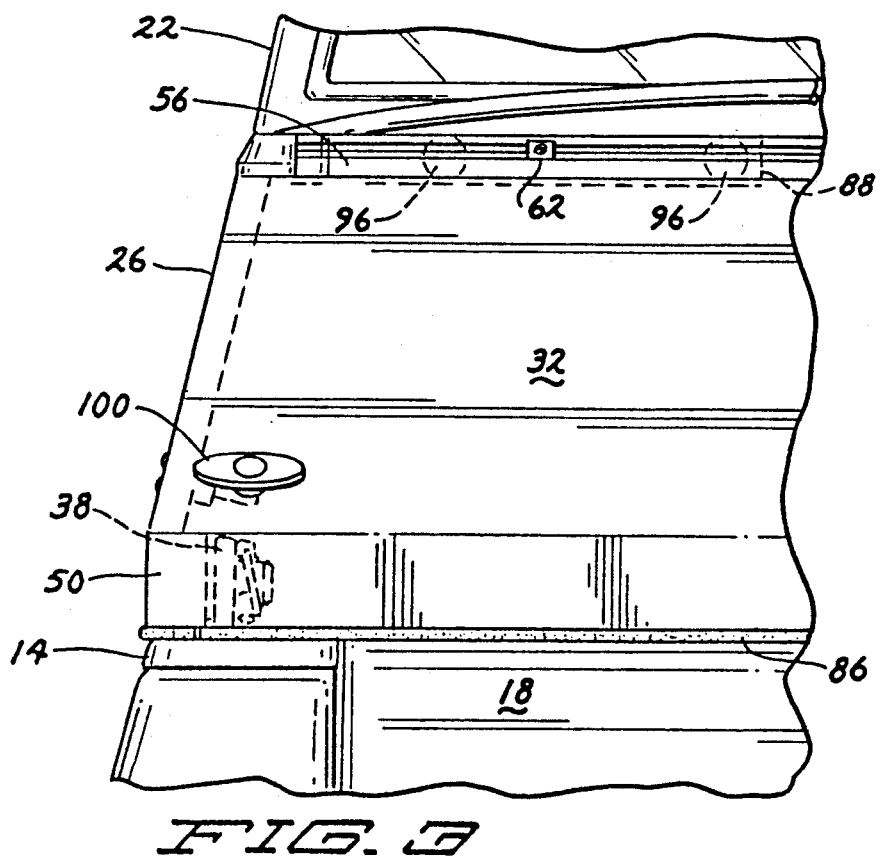
FIG. 3 is a partial rear view of the extension walls of the invention mounted on the cargo bed walls of a pickup truck.
Figure 5:
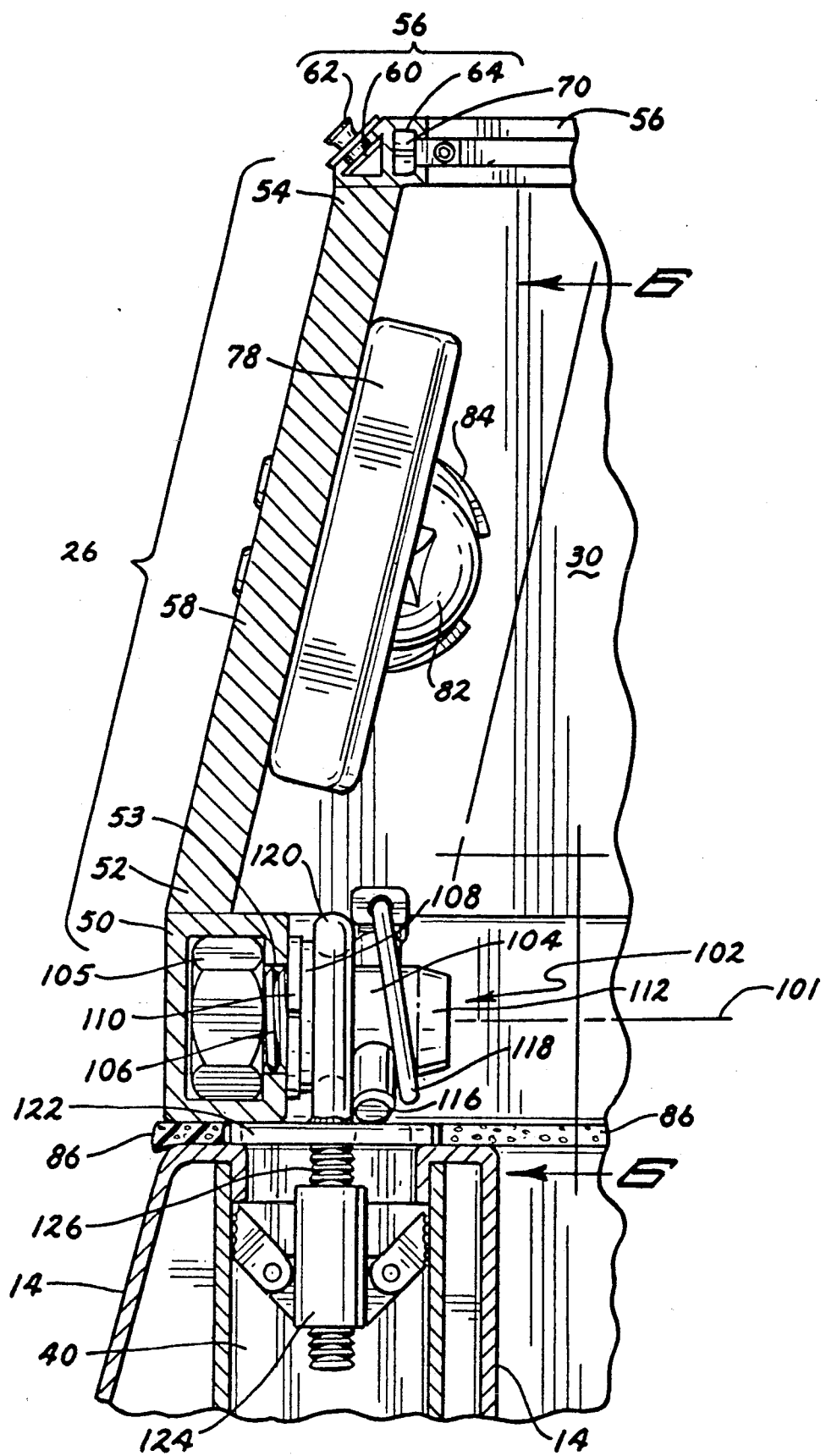
FIG. 5 is a rear cross-sectional view through an extension side wall of the invention, as taken along line 5—5 of FIG. 2.

The exterior of the left side panel 26 is shown, as are phantom endwise views of the front panel 30 and rear panel 32. The left side panel 26 is generally planar with an elongate mounting C-channel 50 extending along its lower interior edge 52 (see FIG. 5). The mounting C-channel 50 has a continuous slot 53 opening to the inside of the cargo compartment 12 for attachment of the side panel 26 to the pickup truck 10. The upper edge 54 of the side panel 26 is shown with an attached tonneau cover rail 56 for mounting a tonneau cover 34 over the expanded cargo compartment 12. Such cover mounting rails 56 are commercially available. As depicted in FIGS. 2 and 5, the tonneau cover rail includes an outer channel member 60 in which cover snaps 62 may be positioned, and an inner channel member 64 useful for retaining the ends of tonneau supporting bows 66 (see FIG. 4).

The lower mounting C-channel 50, central panel portion 58 and tonneau cover rail 56 are joined by welding, cementation or other method to form the panel 26.

Optionally, the side panels 26, 28 including the mounting C-channel 50 and tonneau cover rail 56, may be integrally formed in a single process, e.g. by extrusion.

The panels 26, 28 may be made from rigid plastic, reinforced plastic, or a metal such as aluminum. Aluminum may be anodized or coated in a wide range of colors to match the color(s) of the pickup truck, for example. Other materials are available in various colors and may be useful in forming the extension wall.

The central panel portion 58 is shown with flat planar inner and outer surfaces. The surface configuration may take other forms as desired to achieve light weight, high strength and other requirements.

In most cases it is desirable to insert a pad 86 of foam or other material between the cargo compartment walls and the extension panels. If desired, a bed liner may be used for protection of the truck bed. Such liners are typically formed of hard plastic and may extend over the horizontal surface of the cargo compartment side walls 14, 16 and forward wall 20.

The right side panel 28 is shown as a mirror image of the left side panel 26.

The left and right ends of the front panel 30 are shown as overlapping the side panels 26, 28 and atop the cargo compartment forward wall 20. Each upper corner piece 68 has a protrusion 70 which slides into the inner channel member 64 of the side panel 26, 28 to hold the side panels and front panel 30 together. A longitudinal spacer 72 is shown mounted on the lower rear portion of the front panel 30 with each end thereof abutting a side panel 26, 28.

The front panel 30 is further attached to the side panels 26, 28 with latch assemblies 74 (see FIGS. 2, 5, 6 and 7). The particular latch assembly 74 shown includes an elastomeric latch 76 with handle 78. The latch 76 is attached by a mount 80 to the front panel 30, and it has an enlarged portion 82 which is pulled rearward and held by receiver 84 attached to the side panel 26 or 28. This clamping latch assembly, manufactured by DE-STA-CO Company, is illustrative of the types of latches which may be used.

If desired, this same clamping latch assembly may be used to attach a rear panel to the side panels.

As shown in FIGS. 2, 3, 4, and 7, the rear panel 32 overlaps, or partially overlaps the side panels 26, 28. The joints between the rear panel 32 and the side panels 26, 28 may be chamfered as shown, and the panel 32 is hinged about forwardly positioned hinge assemblies 88 so that it may be swung open upwardly, independently of the position of the tailgate 18. As depicted, coaxial hinge pins 90 project outwardly from the hinge assemblies 88 and fit into slots 94 in hinge pin receivers 92. The latter are attached to the inner channel member 64 of the tonneau cover rail 56 of the side panels 26, 28 by bolts or other attachment means. The hinge assemblies 88 are spaced forwardly from the rear panel 32 by members 96 (see FIG. 4) to increase the opening height when the rear panel 32 is lifted. The spacing members 96 are attached to the inner channel member 64 of the tonneau cover rail 56 of the rear panel 32. The use of slots 94 in the pin receivers 92 enables the rear panel 32 to be easily lifted and removed from the truck without uncrewing any fasteners.

The rear panel 32 is shown with a swivel handle lock 100 on each end for rigidly joining the rear panel to the side panels 26, 28. Other locking mechanisms known in the art may alternatively be used.

Figure 5A:
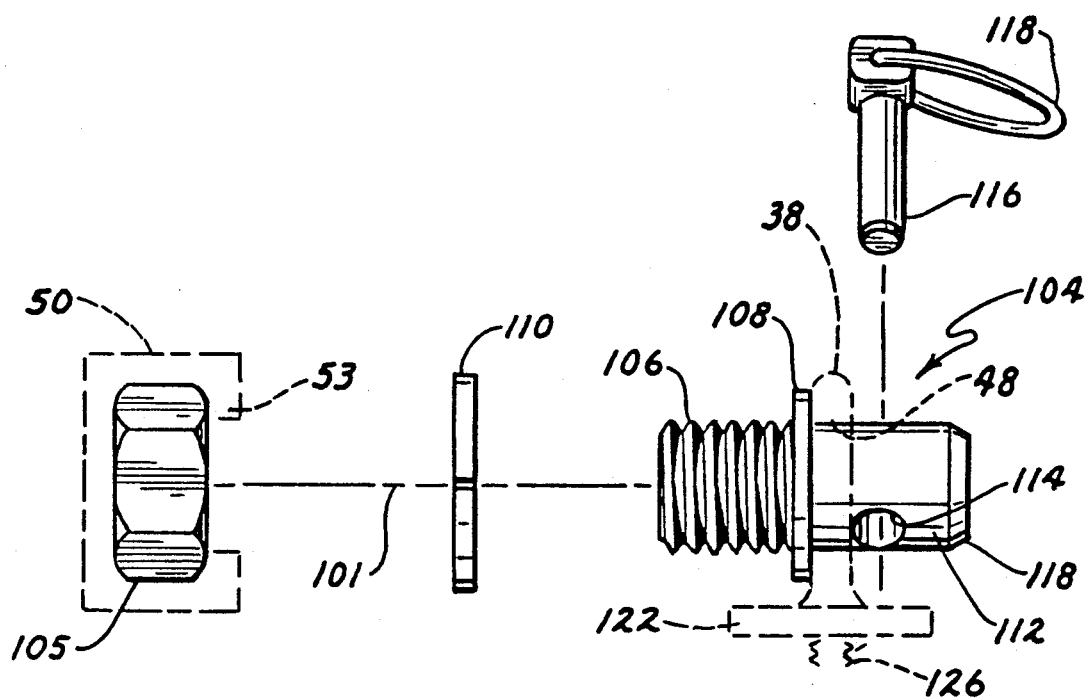
FIG. 5A is an exploded side view of an extension wall fastener of the invention.

Turning now to the means by which the side panels 26, 28 are detachably attached to the side walls 14, 16 of the truck cargo compartment 12, we view an attachment fastening assembly 102 and its interaction with the side panels and stake pocket tie-downs 38 in FIGS. 5, 5A and 6. Fastener 104 is a bolt-like device with a central axis 101. It has a first threaded end 106 for passage through continuous slot 53 and screwed insertion into hex nut 105, the latter slidingly positioned within the mounting C-channel 50 adjacent a stake pocket 40. A central flange 108 engages the mounting C-channel 50 or an optional intermediate washer 110 to provides a rigid attachment of the fastener 104 to the side panel 26, 28. The fastener head 112 comprises the second end of the fastener 104 and is configured to pass through a tie-down port 48 of a tie-down 38. A transverse aperture 114 through the head 112 is positioned to tightly hold the tie-down 38 between the flange 108 and a pin 116 inserted in the aperture 114. The extremity 118 of the fastener head 112 is preferably chamfered or rounded to facilitate insertion into the tie-down port 48.

Washer 110 may be of the locking type and is typically used on the outside of the mounting C-channel 50 to protect the mounting channel from rotational forces of the fastener flange 108. Where the C-channel 50 is of a size which permits rotation of the hex nut 105, a washer may optionally be located adjacent the hex nut to prevent its rotation.

The pin 116 is preferably a locking pin of the quick release type, as is well known in the art. As illustrated, such pins may have a ring 118 which snaps over the fastener head 112 to prevent the inadvertent removal of the pin 116 from the aperture 114.

The tie-down 38 may be of any type which has a transverse port 48 through which a fastener head 112 may be passed and locked with a pin. The illustrated tie-down 38 has an upper head 120 with a round port 48, a flange 122, and a lower mechanism 124. The tie-down may also comprise a simple eye hook. The tie-down 38 is locked within a stake pocket 40 by turning the head and central threaded member 126 into the lower mechanism 124 to expand it in the stake pocket.

The fastening assembly 102 may be positioned anywhere along the continuous slot 53 of the C-channel 50. Thus, the extension wall side panels are easily adapted to pickup truck cargo compartments of varied stake pocket locations or numbers of stake pockets. The side panels 26, 28 may be quickly and easily installed and removed merely by insertion or removal of the locking pins 116. Likewise, the front panel 30 and rear panel 32 are easily attached to the side panels with simple latches 76 and hinge assemblies 88. When a tonneau cover rail 56 is attached to the extension walls, its strength is greatly enhanced by the strength of the walls. This is particularly true of the rear panel area, where the tonneau cover rail is otherwise attached only at its ends.

The fasteners 104, once mounted, remain in the desired location along the channel to correspond to the tie-down spacing.

The extension wall apparatus of the inveniton has numerous other advantages over prior art structures. The entire wall structure may be installed or removed in minutes. The fasteners are located on the inside of the panels, away from general view. There are no external fasteners and the like which detract from the appearance of the extension walls. The drilling of holes in the pickup truck is avoided, and the attachment is made to already installed tie-downs which are otherwise useful devices on a pickup truck.

If desired, one or both of the side panels 26, 28 may be installed by themselves, i.e. without also installing the front and/or rear panel 30, 32, respectively.

It should be noted that the extension wall structure 24 may be formed either with or without a tonneau cover rail 56.

Optionally, other apparatus may be incorporated in the extension wall structure to accomplish a particular desired result.

It is anticipated that various changes and modifications may be made in the construction, arrangement, operation and method of construction of the extension wall structure disclosed herein without departing from the spirit and scope of the invention as defined in the following claims.

What is claimed is:

1. An extension wall structure for a sidewall of a cargo compartment of a pickup truck having a sidewall stake pocket tie-down with a port therethrough, said extension wall structure comprising:
   an upright longitudinally extending side wall panel having an exterior face, an interior face, a front end, a rear end, a top edge and a lower edge;
   a longitudinal mounting channel joined to the side wall panel along the lower edge thereof and having a hollow interior portion and a mounting face generally adjacent said interior face, said channel having a longitudinal slot extending from said mounting face into said hollow interior portion;
   a fastener having a first end slidably attachable to said mounting channel and a second end configured to lockably project through said port of a stake tie-down to fix said side wall panel to said cargo compartment sidewall.

2. The extension wall structure of claim 1, wherein said slot is continuous with said mounting channel.

3. The extension wall structure of claim 1, wherein said channel is a straight C-channel with an elongate center slot.

4. The extension wall structure of claim 1, wherein said channel is configured for slidable placement therein of a nut with a threaded bore and a central axis, said nut configured for slidable positioning within said hollow interior portion for projection of said central axis through said slot.

5. The extension wall structure of claim 1, wherein said side wall panel and elongate channel are integrally formed as a single unit.

6. The extension wall structure of claim 1, wherein said side wall panel and elongate channel are integrally formed by extrusion of metal.

7. The extension wall structure of claim 1, wherein said fastener comprises:
   an elongate axially rotatable shaft with a first end and a second end and a longitudinal axis therethrough, said shaft comprising:
      said first end configured to pass through the elongate slot and be attached to a threaded nut;
      said second end configured to pass through the transverse port of a stake tie-down and having a transverse aperture therethrough for accepting a locking pin therein; and
   a central flange of enlarged diameter between said first and second ends, said flange having an enlarged diameter with a first face for abutting said stake tie-down, and a second face;
   wherein the transverse aperture is spaced from said central enlarged flange for removable retention of said ported stake tiedown between said flange and said locking pin.

8. The extension wall structure of claim 7, wherein said threaded nut has an external shape and size configured to be rotatably fixed and longitudinally slidable within said mounting channel.

9. The extension wall structure of claim 1 for a cargo compartment including a left sidewall, a right sidewall and a cargo compartment front wall, wherein said side wall panel comprises:
   a left side panel extendable upwardly from the left cargo compartment sidewall, and
   a right side panel extendable upwardly from the right cargo compartment sidewall.

10. The extension wall structure of claim 9, further comprising a front extension wall for extending upwardly from the cargo compartment front wall, said front extension wall comprising:
    a generally longitudinal planar front panel having front and rear surfaces with left and right edges, said left and right edges of said front panel configured to alignably engage the front edges of said left side panel and right side panel respectively; and
    latching means for removably joining said front panel to said left and right side panels.

11. The extension wall structure of claim 10, wherein said latching means comprises clamps affixed to the interior surface of each said side panel, said clamps engagable with the rear surface of said front panel.

12. The extension wall structure of claim 9, further comprising a rear extension wall structure for positioning above the tailgate of the cargo compartment, said rear extension wall structure comprising:

an elongate generally planar rear panel having front and rear surfaces with left and right ends; and mounting means for removably attaching said rear panel to the left and right side panels.

13. The extension wall structure of claim 12, wherein said mounting means comprises:

hinge assemblies mounted on said left end and right end of said rear panel, each said hinge assembly including a hinge pin; and hinge pin receivers mounted on said left panel and right panel, each said hinge pin receiver configured to removably receive a said hinge pin for pivotable movement of said rear panel independent of the position of said tailgate.

14. An extension wall structure for a cargo compartment of a pickup truck having left and right sidewalls with stake pocket tie-downs, a front wall and a rear tailgate, each said tie-down having a port therethrough, said extension wall structure comprising:

left and right upright longitudinally extending side wall panels, each said panel having an exterior face, an interior face, a front end, a rear end, a top edge and a lower edge;

a longitudinal mounting channel joined to each side wall panel along the lower edge thereof and having a hollow interior portion and a mounting face generally adjacent said interior face, said channel having a longitudinal slot extending from said mounting face into said hollow interior portion;

a fastener having a first end slidably attachable to said mounting channel and a second end configured to lockably project through said port of a stake tie-down to fix said side wall panel to said cargo compartment sidewall;

an upright elongate front panel having one end removably attachable to the left side wall panel and having an opposite end removably attachable to the right side wall panel wherein said front panel extends upwardly from said front wall of cargo compartment, said front panel having a top edge;

an upright elongate rear panel having one end removably attachable to the left side wall panel and an opposite end removably attachable to the right side wall panel wherein said rear panel extends upwardly from said tailgate, said rear panel having a top edge; and a tonneau cover rail longitudinally attached to the top edges of said side panels, said front panel and said rear panel, for mounting of a tonneau cover thereto to support a cover over the cargo compartment.

15. The extension wall structure of claim 14, wherein said tonneau cover rail is integrally formed with said side panels, front panel and rear panel.

16. The extension wall structure of claim 14, wherein said tonneau cover rail comprises a straight rail with a first channel for slidable attachment of snap fasteners, and a second channel.

17. The extension wall structure of claim 14, wherein each of said left and right side wall panels includes a lowermost longitudinal hollow channel with a longitudinal, inwardly opening slot, said channel configured to slidably retain a first fastener therein for engagement with a matching second fastener through said slot.

18. The extension wall structure of claim 17, wherein said first and second fasteners include matching threaded portions for engagement with each other.

19. The extension wall structure of claim 14, wherein said front panel and rear panel are fully supported by said left and right wall panels.

* * * * *